(12) United States Patent
Yajima et al.

(10) Patent No.: US 12,027,330 B2
(45) Date of Patent: Jul. 2, 2024

(54) ROTATION ANGLE DETECTION SENSOR

(71) Applicant: NIPPON ALEPH CO., LTD., Tokyo (JP)

(72) Inventors: Koichi Yajima, Tokyo (JP); Eiichi Kosuge, Tokyo (JP); Masaya Hagiyama, Tokyo (JP)

(73) Assignee: Nippon Aleph Co., Ltd., Tokyo (JP)

( * ) Notice: Subject to any disclaimer, the term of this patent is extended or adjusted under 35 U.S.C. 154(b) by 270 days.

(21) Appl. No.: 17/630,324

(22) PCT Filed: Jul. 30, 2020

(86) PCT No.: PCT/JP2020/029363
§ 371 (c)(1),
(2) Date: Jan. 26, 2022

(87) PCT Pub. No.: WO2021/020541
PCT Pub. Date: Feb. 4, 2021

(65) Prior Publication Data
US 2022/0254588 A1  Aug. 11, 2022

(30) Foreign Application Priority Data
Jul. 31, 2019  (JP) .................. 2019-141801

(51) Int. Cl.
*H01H 36/00* (2006.01)
*G01B 7/30* (2006.01)
*G01D 5/251* (2006.01)
(52) U.S. Cl.
CPC ........... *H01H 36/0006* (2013.01); *G01B 7/30* (2013.01); *G01D 5/2515* (2013.01)
(58) Field of Classification Search
CPC .................................................. H01H 36/0006
(Continued)

(56) References Cited

U.S. PATENT DOCUMENTS 3,559,205 A * 1/1971 Colby .................... B60K 28/06
200/61.54
3,735,298 A * 5/1973 Colby ................ H01H 36/0006
335/206
(Continued)

FOREIGN PATENT DOCUMENTS

JP  S4828483 U1  4/1973
JP  S5812863 U1  1/1983
(Continued)

OTHER PUBLICATIONS

International Search Report for PCT/JP2020/029363 dated Nov. 2, 2020.
(Continued)

*Primary Examiner* — Alexander Talpalatski
(74) *Attorney, Agent, or Firm* — Millen, White, Zelano & Branigan P.C.; William F. Nixon

(57) ABSTRACT

A rotation angle detection sensor detects the rotation angle of a rotating part attached to a structure including a fixed part and a rotating part that rotates around a rotary shaft. The rotation angle detection sensor includes a reed switch attached to the fixed or rotating part with reeds placed near the rotary shaft. An annular magnet is attached to the rotating or fixed part. A magnetic circuit is formed with respect to the reed switch, with its central axis arranged concentrically with the rotary shaft. When the magnet rotates around the central axis with respect to the reed switch, if the same poles of the magnet are lined up in the longitudinal direction of the reed switch, the reed switch is turned off. If opposite poles of the magnet are lined up in the longitudinal direction of the reed switch, the reed switch is turned on.

5 Claims, 11 Drawing Sheets

(58) Field of Classification Search
USPC .................................................. 335/151–154
See application file for complete search history.

(56) References Cited

U.S. PATENT DOCUMENTS

| | | | | |
|---|---|---|---|---|
| 5,097,209 | A * | 3/1992 | Santos .................. | F02P 7/0677 |
| | | | | 324/207.2 |
| 5,932,856 | A * | 8/1999 | Lopes ...................... | H01H 3/20 |
| | | | | 335/238 |
| 8,350,562 | B2 * | 1/2013 | Gailledrat .......... | H01H 36/0006 |
| | | | | 324/207.21 |
| 8,847,584 | B2 * | 9/2014 | Steinich .................. | G01D 5/04 |
| | | | | 324/207.2 |
| 2008/0164866 | A1 * | 7/2008 | Steinich .................. | G01D 5/08 |
| | | | | 324/207.2 |

FOREIGN PATENT DOCUMENTS

| | | |
|---|---|---|
| JP | H01135631 U1 | 9/1989 |
| JP | H10281708 A | 10/1998 |
| JP | 2003185485 A | 7/2003 |
| JP | 2006284237 A | 10/2006 |
| JP | 2006302732 A | 11/2006 |

OTHER PUBLICATIONS

English Translation of International Search Report for PCT/JP2020/029363 dated Nov. 2, 2020.
English Abstract of JPH10-281708, Publication Date: Oct. 23, 1998.
English Abstract of JP2006284237, Publication Date: Oct. 19, 2006.
English Abstract of JP2003185485, Publication Date: Jul. 3, 2003.
English Abstract of JP2006302732, Publication Date: Nov. 2, 2006.

* cited by examiner

ROTATION ANGLE DETECTION SENSOR

TECHNICAL FIELD

The present invention relates to a rotation angle detection sensor for detecting opening and closing of a rotating part such as a cover attached rotatably around a rotary shaft of a structure, for example.

BACKGROUND ART

To detect the rotation angle of a rotating part, semiconductor linear sensors including the one using a Hall element or magneto-resistive sensor, non-contact-type position sensor using an IC, or rotary encoder and resistive position sensor are known in the prior art. These sensors can detect rotation angles with high accuracy although they require the driving power supplies.

However, to detect opening or closing of a cover of an automatic warm water washing toilet seat, for example, it is unnecessary to ensure detection accuracy as high as that of a highly expensive rotation angle detection sensor. That is why rotation detection sensors and rotation angle detection sensors that use inexpensive reed switches are also known.

Patent Literature 1 discloses a gas meter where the longitudinal direction of a reed switch and the tangential direction of rotational trajectory of a magnet are placed almost in parallel, reeds are magnetized to the same pole when magnetic lines cross the reeds to open them by repulsive force, and the reeds are magnetized to the opposite pole when the magnetic lines pass almost in parallel to the reeds to close them by attraction force, thus outputting pulse signals according the opening and closing of the reed switch.

Patent Literature 2 discloses a pulse generator and a rotation angle detection apparatus where two bias magnets are placed apart from each other along the reeds of a reed switch with the counter magnetic pole set as an opposing pole, and when a sensor magnet that is placed so that magnetic lines cross the longitudinal direction of the reed switch moves, the output signals of the reed switch are switched at the central position between the bias magnets.

CITATION LIST

Patent Literature

Patent Literature 1: JP 2003-185485 A
Patent Literature 2: JP 2006-302732 A

SUMMARY OF INVENTION

Problem to be Solved by the Invention

The rotation angle sensors using a semiconductor device described above have the high functionality and the high detection accuracy. Meanwhile they have the high parts cost, require the driving power, and the running cost is also high. With rotation angle sensors that have a sliding contact such as a resistance-type position sensor and a rotary switch, the life of the sliding contact is short, the periodic maintenance is necessary, and the explosion-proof design is difficult, thus increasing the cost.

The gas meter in Patent Literature 1 detects rotation of a rotating member by using the reed switch placed outside the rotation trajectory of the magnet that rotates with the rotation of the rotating member. The reed switch itself is inexpensive and requires no driving power. However, since the increase and the decrease of magnetic lines that pass the reeds of the reed switch with the rotation of the magnet (change of magnetic flux density) are slow, the detection of rotation depends on the working value of the reed switch. Consequently, such meters are effective to measure the number of rotations, but the high-accuracy rotation angle detection cannot be expected.

With the pulse generator and the rotation angle detection apparatus disclosed in Patent Literature 2, since magnets are placed so that the longitudinal direction of the magnets extend from the central axis of a part whose rotation is to be detected along its radius, the size of the apparatus itself increases. In addition, since bias magnets are necessary, the number of parts becomes large, thus increasing the cost.

The present invention intends to provide a compact and simple-structure rotation angle detection sensor capable of detecting the rotation angle of the rotating member.

Means for Solving the Problem

To achieve the above-mentioned objective, the present invention provides a rotation angle detection sensor that is attached to a structure including a fixed part and a rotating part supported around a rotary shaft with respect to the fixed part to detect the rotation angle of the rotating part, the rotation angle detection sensor including a reed switch attached to the fixed part or the rotating part of the structure perpendicular to the rotary shaft with the reeds disposed near the rotary shaft, and a flat annular magnet arranged at a specified positions in the direction of the rotary shaft with its central axis disposed concentrically with the rotary shaft of the structure so that a magnetic circuit is formed in the reed switch, characterized in that the magnet is multi-pole magnetized in parallel to the central axis, and when the magnet rotates around the central axis with respect to the reed switch with the rotation of the rotating part of the structure, both reeds of the reed switch are respectively magnetized to the same pole if the same poles of the magnet are aligned in the longitudinal direction of the reed switch, thereby turning off the reed switch, and if different magnetic poles of the magnet are aligned in the longitudinal direction of the reed switch, the both reeds of the reed switch are respectively magnetized to a different pole, thereby turning on the reed switch.

According to the above structure, since the both reeds of the reed switch are respectively magnetized to the same pole when the same poles of the magnet are aligned in the longitudinal direction of the reed switch while the rotating part of the structures are rotating, the reeds move away from each other due to repulsive force, turning off the reed switch. Since the reeds of the reed switch are magnetized to an opposite pole when opposite poles of the magnet are aligned in the longitudinal direction of the reed switch, the reeds contact each other by the magnetic attraction force, turning on the reed switch. Thus, with the rotation of the rotating part of the structure with respect to the fixed part, the reed switch is turned on or off according to the multi-pole magnetization of the magnet, allowing the rotation of the rotating part of the structure to be detected.

When a back yoke is placed on the side of the reed switch, since the magnetic field lines of the magnet pass through the back yoke, thus preventing diffusion of the magnetic flux that acts on the reeds of the reed switch, higher accuracy in rotation angle detection is ensured.

If the magnet and the reed switch respectively have an engagement part, that of the magnet is engaged with that of the reed switch, and thus the rotation detection angle of the magnet with respect to the reed switch is regulated to an arbitrary angle without fail when the magnet rotates with respect to the reed switch.

If the magnet is structured to be magnetized in a direction opposite to other areas in a specified angle range only with respect to the central axis, the reeds of the reed switch are magnetized to the opposite pole when the specified angle range is positioned in the longitudinal direction of the reed switch, and thus the reed switch is turned on. In other words, the reed switch is turned on only within the specified angle range, ensuring detection of the specified angle range of the rotating part of the structure with respect to the fixed part. If the reed switch and the magnet are structured to be positioned along the central axis of the rotation angle detection sensor, the reed switch is turned on only within the specified angle range of the magnet, ensuring detection of the angle range of the rotating part of the structure with respect to the fixed part.

Effects of the Invention

The present invention provides a compact, simple-structure, and highly functional rotation angle detection sensor capable of detecting the rotation angle of a rotating part.

BRIEF DESCRIPTION OF DRAWINGS

FIG. 3B is a schematic plan view showing the positional relation between the reed switch and the magnet when the reed switch is on.

FIG. 7A is a schematic plan view showing the positional relation between the reed switch and the magnet in the modification where the reed switch is on.

EMBODIMENTS OF THE INVENTION

A first embodiment shown in FIGS. 1A to 5C will hereinafter be described in detail.

Figure 1A:
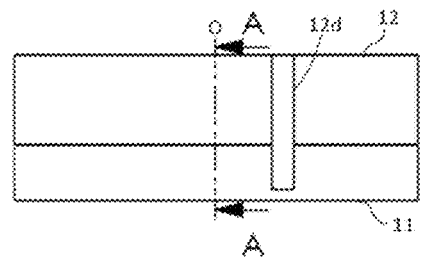
FIG. 1A is a front view of a first embodiment of the rotation angle detection sensor of the present invention.
Figure 1B:
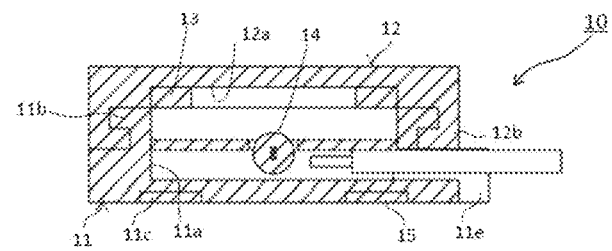
FIG. 1B is a cross-sectional view of FIG. 1A taken along line A-A.
Figure 1C:
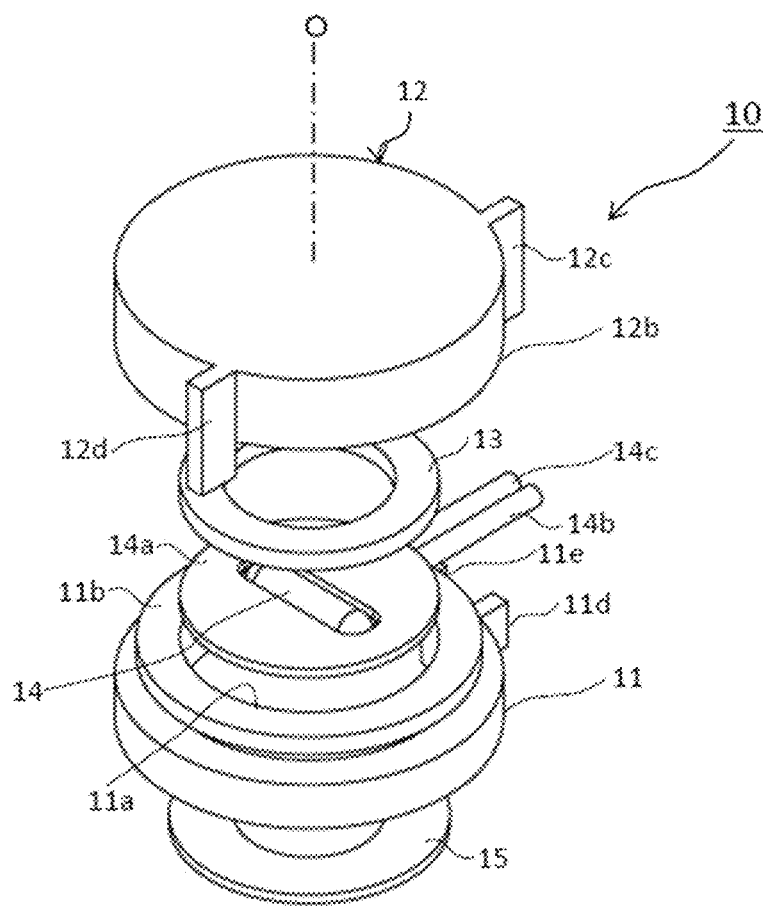
FIG. 1C is an exploded perspective view of FIG. 1A.
Figure 11:
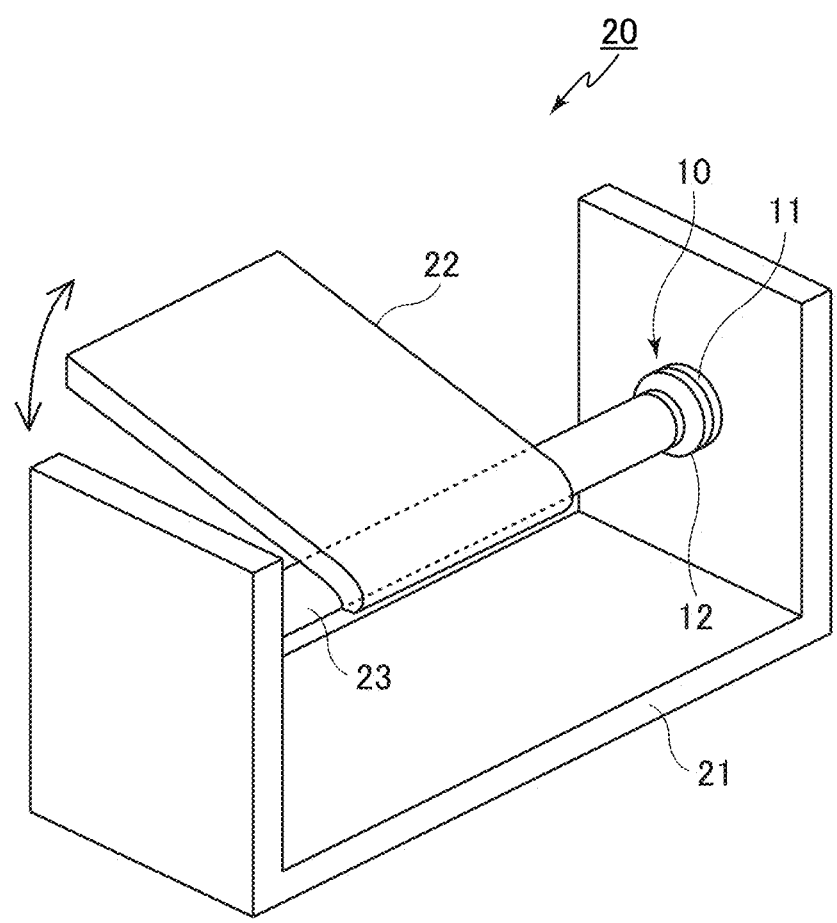
FIG. 11 is an external view showing a fixed part of a structure and a rotation angle detection sensor attached to a rotating part of the structure.

As shown in FIGS. 1A to 1C, this rotation angle detection sensor 10 includes a base 11, a cover 12, a magnet 13, a reed switch 14, and a back yoke 15. As shown in FIG. 11, the rotation angle detection sensor 10 is mounted to a structure 20 whose rotation angle is to be detected. With the rotation angle detection sensor 10 as shown in FIG. 11, the base 11 is fastened to a fixed part 21 of the structure 20, and the cover 12 is fastened to a rotary shaft 23, for example, of a rotating part 22. The reed switch 14 is accepted by the base 11, and the magnet 13 is housed in the cover 12. Reverse mounting is also allowed: the base 11 may be fastened to the rotary shaft 23 and the cover may be fastened to the fixed part 21 respectively.

The base 11 of the rotation angle detection sensor 10 is made of a non-magnetic material such as a resin, for example, formed in an approximately flat disk shape, and fastened to the fixed part 21 or the rotating part 22 of a structure 20 whose rotation is to be detected so that the central axis O of the rotation angle detection sensor 10 coincides with the rotary shaft 23 of the structure 20. The base 11 has a reed switch accepting part 11a that is open upwards, and on its top face peripheral edge, an engagement part 11b is provided. On the bottom face peripheral edge of the base 11, a ring-shaped groove 11c is formed, and furthermore on the outside in the radial direction, a pair of protrusions 11d, 11e extending in the right direction as shown in FIG. 1C are provided to regulate rotation.

The cover 12 is made of a non-magnetic material such a resin, formed in a flat disk shape as in the case of the base 11, and fastened to the rotating part 22 or the fixed part 21 of the structure 20 whose rotation is to be detected. The cover 12 has a concave part 12a that is open downwards on the bottom face, and on the bottom face peripheral edge, an engagement part 12b is provided. When the cover 12 is placed on the base 11, this engagement part 12b is engaged with the engagement part 11b of the base 11 and thus supported in relatively rotatable state around the central axis O on the base 11. Furthermore, the cover 12 has a pair of protrusions 12c, 12d extending from the outer peripheral surface toward outside to regulate rotation.

As shown in FIG. 1C, the pair of protrusions 12c, 12d of the cover 12 is placed apart from the central axis O to one side, i.e. to the right side in the case shown in FIG. 1C, and extending downwards exceeding the bottom edge of the cover 12. When the cover 12 shown in FIG. 1C rotates counterclockwise, the protrusion 12c of the cover 12 abuts against the protrusion 11d of the base 11, thus regulating the counterclockwise rotation of the cover 12. Also, when the cover 12 rotates clockwise, the protrusion 12d abuts against the protrusion 11e of the base 11, regulating the clockwise rotation of the cover 12 and limiting the rotation angle range to 180 degrees.

The magnet 13 is made of a permanent magnet such as ferrite and neodymium, etc., and formed in a flat annular shape. The magnet 13 is housed in the concave part 12a of the cover 12 and fixed concentrically with the central axis O of the cover 12. The magnet 13 is fixed to the rotating part 22 or the fixed part 21 of the structure 20 at a specified distance away from the reed switch 14 in the direction of the rotary shaft of the rotating part 22 so that a magnetic circuit is formed for the reed switch 14.

Figure 2A:
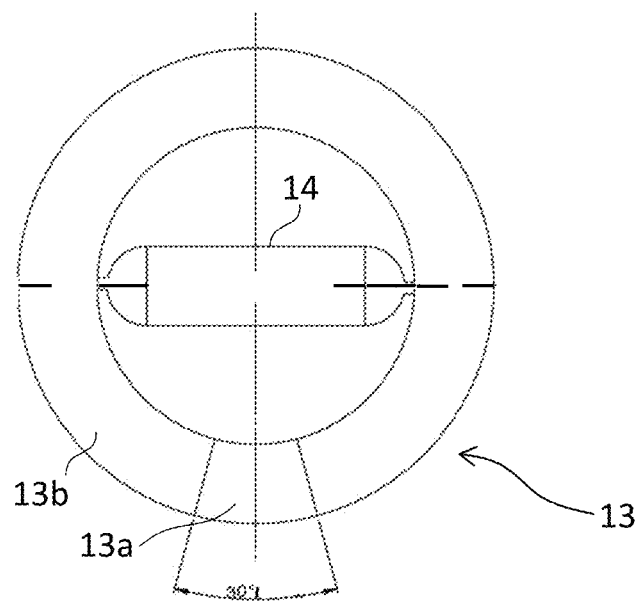
FIG. 2A is a plan view of the major part of the rotation angle detection sensor.
Figure 2B:
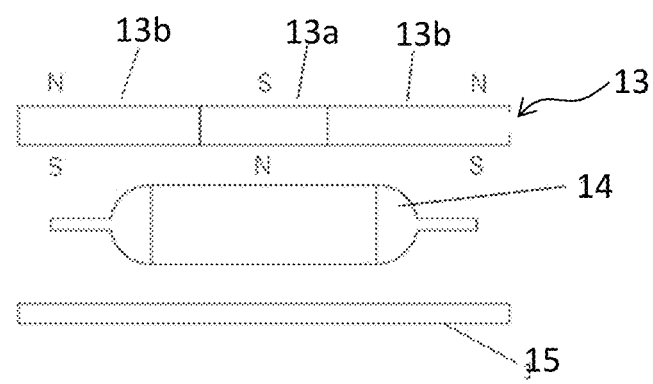
FIG. 2B is a front view of FIG. 2A.

The magnet 13 is multi-pole magnetized in parallel to the central axis O of the rotation angle detection sensor so that the upper part becomes S pole and the lower part becomes N pole, whereas in the remaining area the upper part becomes N pole and the lower part becomes S pole as shown in FIG. 2B, in a specified angle range, in area 13a of 30 degrees for example, as shown in 2A in detail. The area 13a of the magnet 13 is called a reversely magnetized area, whereas the remaining area 13b is called a forwardly magnetized area.

The reed switch 14 has a known structure and is placed with its longitudinal direction perpendicular to the central axis O of the base 11. The reed switch 14 is mounted to a printed circuit board 14a, and by engaging the printed circuit board 14a with the reed switch accepting part 11a of the base 11 for fastening, a pair of reeds 14d, 14e (FIG. 3A) are positioned with respect to the base 11 so that they come near the central axis O of the base 11, and lead wires 14b, 14c are drawn outside of the printed circuit board 14a. The reed switch 14 is thus mounted to the fixed part 21 or the rotating part 22 of the structure 20 perpendicular to the rotary shaft of the rotating part 22, with the lead wires 14b, 14c placed around the rotary shaft.

A back yoke 15 is made of a magnetic material, formed in an annular shape having almost the same external and internal diameters as those of the magnet 13, and inserted into and fastened to annular groove 11c on the bottom face of the base 11.

Depending on the arrangement of the above-mentioned magnet 13, the reed switch 14, and the back yoke 15, and also depending on the type of the magnet 13 placed adjacent to the both ends of the reed switch 14, the reed switch 14 is turned on or off as described below.

Figure 3A:
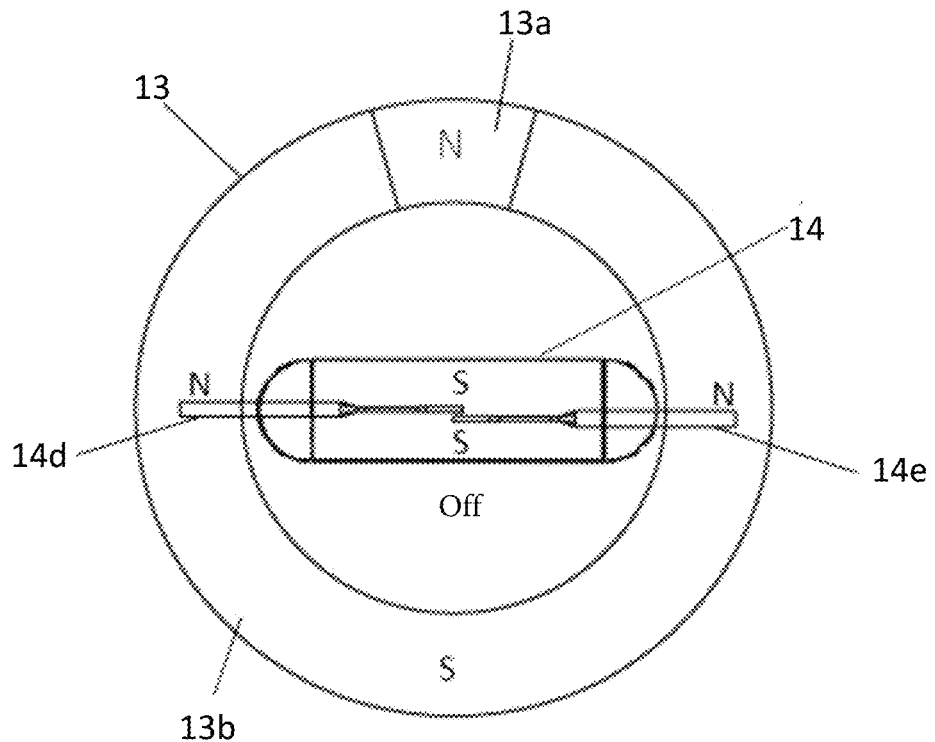
FIG. 3A is a schematic plan view showing the positional relation between a reed switch and a magnet when the reed switch is off.

As shown in FIG. 3A, for example, when S pole of the magnet 13 comes close to the reeds 14d, 14e of the reed switch 14, the outer ends of each reed 14d, 14e become N pole, and the inner ends of each become S pole accordingly. The reeds 14d, 14e thus move away from each other by repulsive force, turning off the reed switch 14. In other words, when the area 13a of the magnet 13 is positioned perpendicular to the longitudinal direction of the reed switch 14 as shown in FIG. 3A, the same poles of the magnet 13 are lined up in the longitudinal direction of the reed switch 14, turning off the reed switch 14.

Figure 3B:
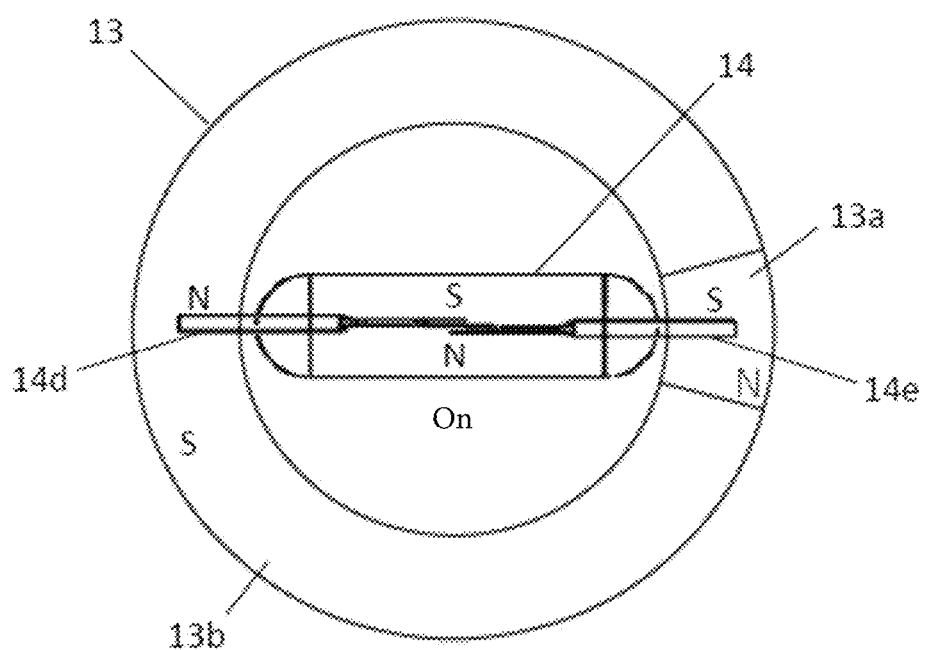

Meanwhile, as shown in FIG. 3B, when S and N poles of the magnet 13 respectively come close to the reeds 14d, 14e of the reed switch 14, the outer end of each reed 14d, 14e respectively become N and S poles, and the inner ends respectively become S and N poles accordingly. As a result, the reeds 14d, 14e contact each other by magnetic attraction force, turning on the reed switch 14. In other words, when the area 13a of the magnet 13 is placed in the longitudinal direction of the reed switch 14, the opposite poles of the magnet 13 are line up in the longitudinal direction of the reed switch 14, turning on the reed switch 14.

The rotation angle detection sensor 10 according to the embodiment of the present invention operates as follows.

Figure 4:
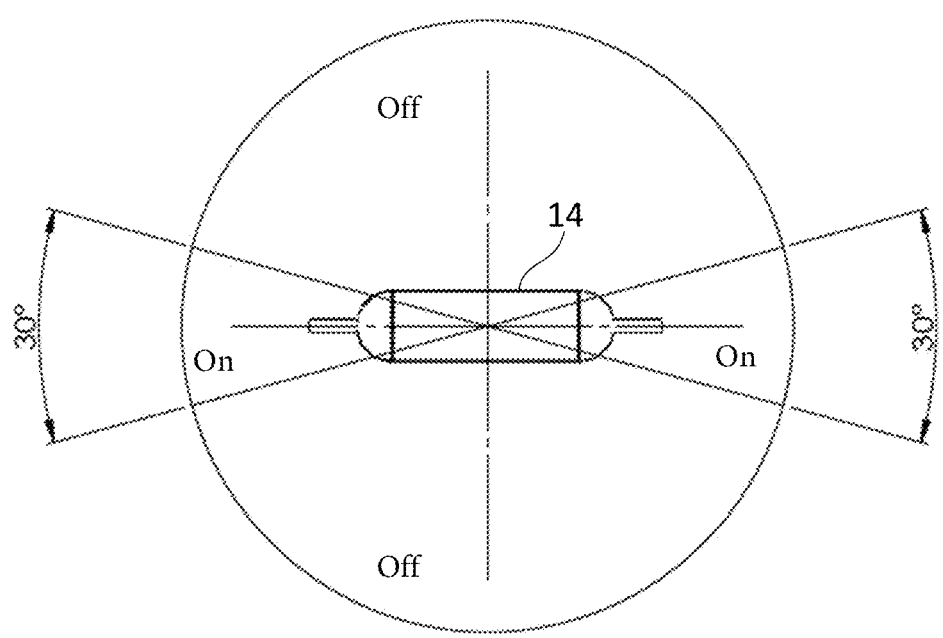
FIG. 4 is a schematic plan view showing the angle range of the reed switch when it is on and off with respect to the rotation angle of the magnet.

Firstly, the base 11 of the rotation angle detection sensor 10 is mounted to the fixed part 21 or the rotating part 22 of the structure 20, and the cover 12 is mounted to the rotating part 22 or the fixed part 21 of the structure 20. When the rotating part 22 of the structure 20 rotates around the rotary shaft 23 with respect to the fixed part 21, the cover 12 also rotates accordingly around the central axis O with respect to the base 11. That means, as shown in FIG. 4, that the reed switch 14 is turned on in the angle range of 30 degrees respectively with respect to the extending direction of the reed switch 14, and it is turned off in the remaining angle range. When the area 13a of the magnet 13 is relatively positioned within this angle range with respect to the reed switch 14, the reed switch 14 is turned on, and the rotating part 22 with respect to the fixed part 21 of the structure 20 is detected to be within the corresponding angle range.

Figure 5A:
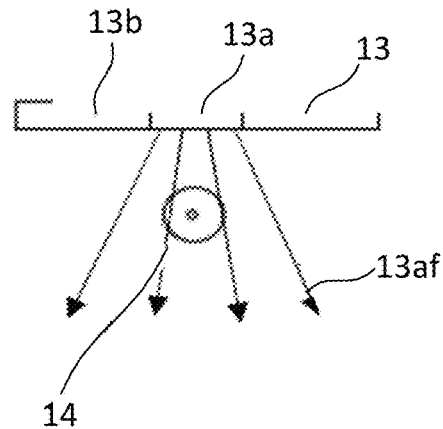
FIG. 5A is a schematic side view showing the distance of the magnet in the direction of central axis and the distribution of magnetic field lines generated when no back yoke is provided.
Figure 5B:
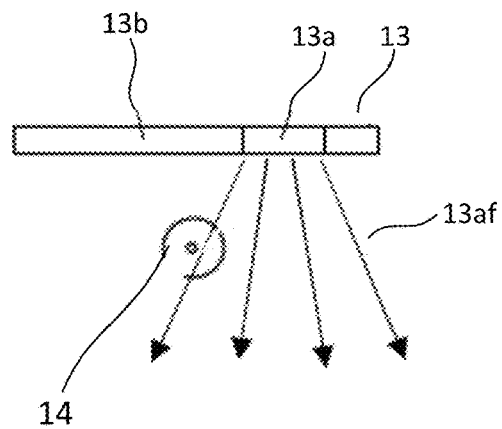
FIG. 5B is a schematic side view showing a case when the magnet in FIG. 5A is rotated.

In this case, as shown in FIG. 5A, the farther the downward position of the reed switch 14 from the magnet 13, the more the magnetic flux 13af from the reversely magnetized area 13a of the magnet 13 diffuse, expanding the angle range where the reed switch 14 is turned on to exceed the angle range of the area 13a of the magnet 13. Consequently, as shown in 5B, even if the area 13a goes away from the reeds of the reed switch 14 with the rotation of the magnet 13, the magnetic flux 13af reaches the reeds, turning on the reed switch 14. The angle range where the reed switch 14 is turned on thus expands, decreasing the accuracy of rotation angle detection.

Figure 5C:
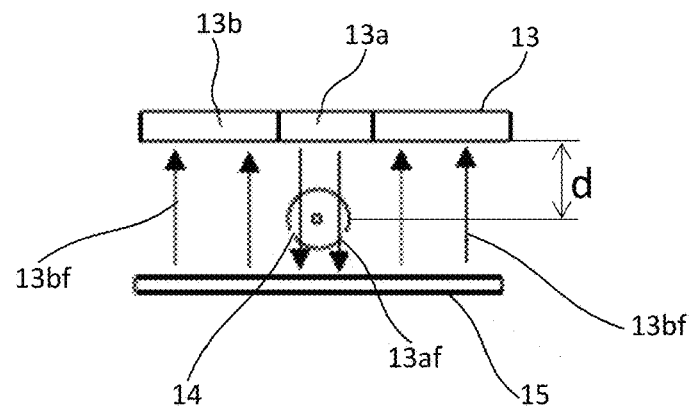
FIG. 5C is a schematic side view showing the distance of the magnet in the direction of central axis and the distribution of magnetic field lines generated when a back yoke is provided.

It is therefore desirable, as shown in FIG. 5C, that the magnet 13 and the reed switch 14 come as close to each other as possible, minimizing the distance d between them, and at the same time a magnetic circuit be formed by placing the back yoke 15 under the reed switch 14, keeping the magnetic flux 13af, 13bf extending from the magnet 13 approximately in parallel to each other, and decreasing the leakage of magnetic flux to outside. By placing the back yoke 15, the area 13a of the magnet 13 and the angle range where the reed switch 14 is turned on become approximately the same, thus increasing the accuracy of rotation angle detection.

(Modification of the Magnet)

Figure 6A:
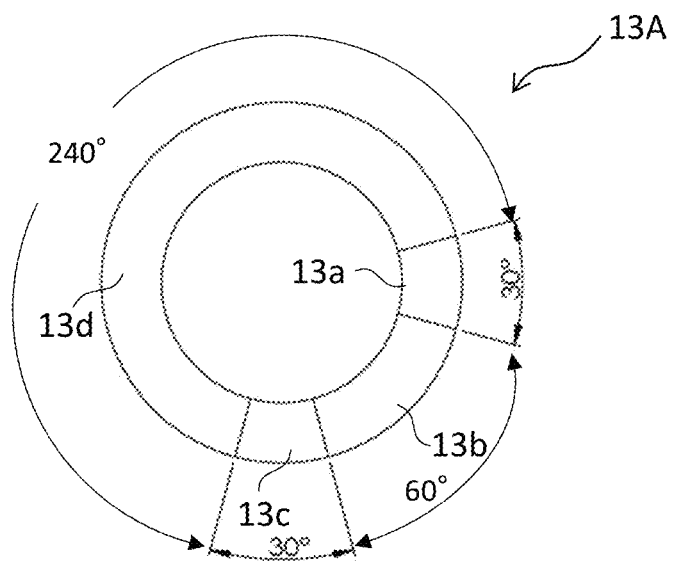
FIG. 6A is a plan view of a modification of the magnet.
Figure 6B:
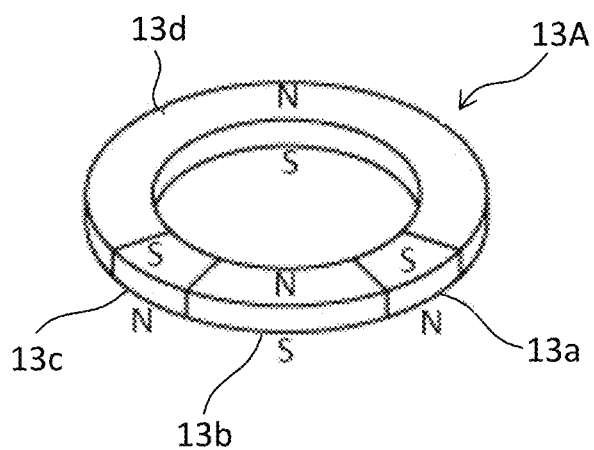
FIG. 6B is a perspective view of FIG. 6A.

FIGS. 6A and 6B show a typical modification of the magnet. This magnet 13A consists of 30-degrees reversely magnetized area 13a, 60-degrees forwardly magnetized area 13b, 30-degrees reversely magnetized area 13c, and 240-degrees forwardly magnetized area 13d, for example. Since the top and bottom faces of the magnet 13A are respectively magnetized to 4 poles, it is called as the double-sided 8-pole magnetization.

Figure 7A:
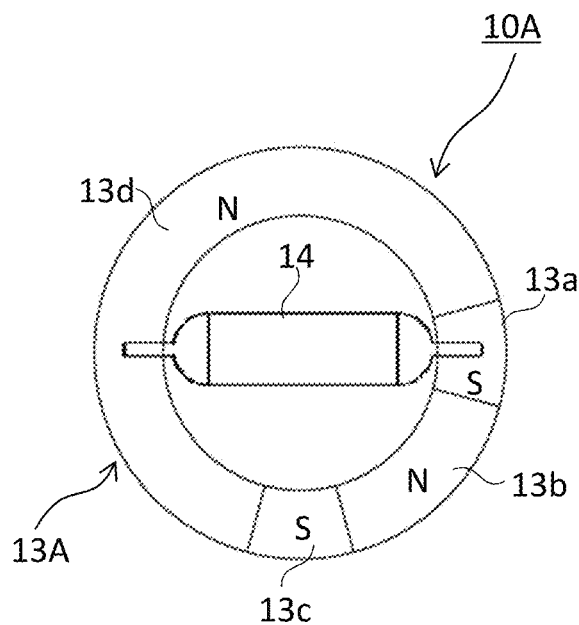
Figure 7B:
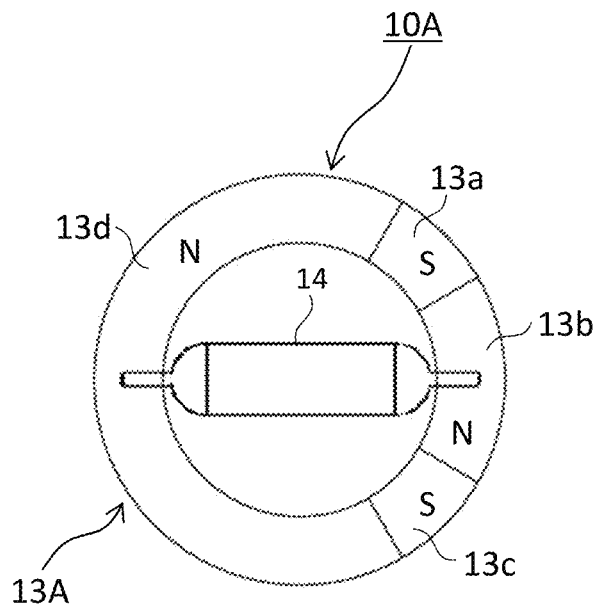
FIG. 7B is a schematic plan view showing the state where the reed switch in FIG. 7A is off.

FIGS. 7A and 7B are schematic plan views showing an example of positional relation between the reed switch and the magnet 13A of the rotation angle detection sensor 10A that uses the magnet 13A as shown in FIG. 6B, where FIG. 7A shows the case when the switch is on, and FIG. 7B shows the case when the switch is off. Since the rotation angle detection sensor 10A is the same as the rotation angle detection sensor 10 except for the magnet 13A, the explanation will be omitted. As shown in FIG. 7A, when area 13a, or area 13c, and area 13d, of the magnet 13A are positioned in the longitudinal direction of the reed switch 14, opposite poles of the magnet are lined up in the longitudinal direction of the reed switch 14, turning on the reed switch 14. Meanwhile, as shown in FIG. 7B, when areas 13b and 13d of the magnet 13A are positioned perpendicular to the longitudinal direction of the reed switch 14, the same poles (N) of the magnet 13A are lined up in the longitudinal direction of the reed switch 14, turning off the reed switch 14.

Figure 8:
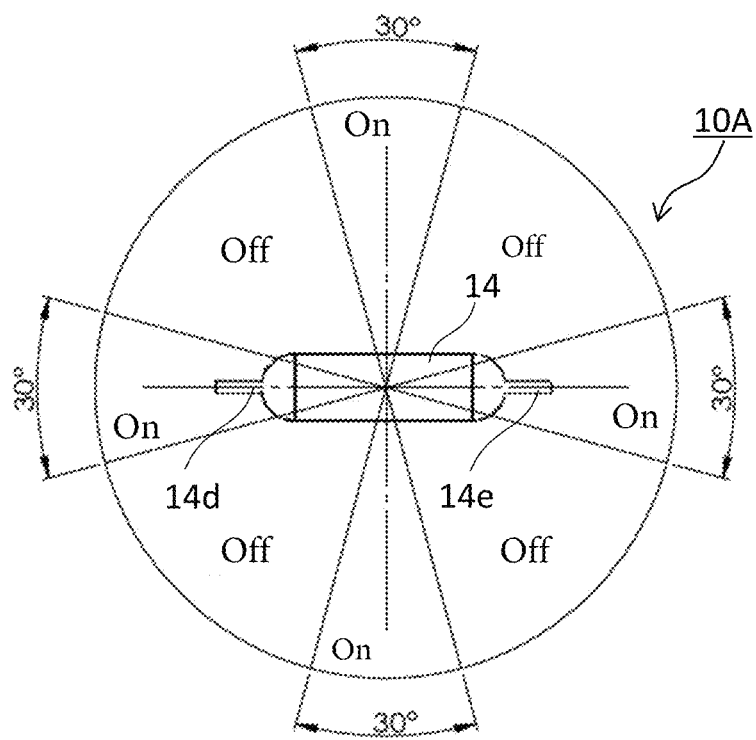
FIG. 8 is a schematic plan view showing the angle range of the reed switch when it is on and off with respect to the rotation angle of the magnet.

FIG. 8 is a schematic plan view showing ON and OFF angle ranges of the reed switch 14 with respect to the rotation angle of the magnet of the rotation angle detection sensor 10 using the modification of the magnet. Every time the both ends of the reeds 14d, 14e of the reed switch 14 come close to N and S poles of the magnet 13A, namely every time the both ends enter the angle range magnetized to the opposite pole, the reed switch 14 is turned on. Meanwhile, every time the both ends of the reeds 14d, 14e of the reed switch 14 enter the area magnetized to the same pole of the magnet 13A, the reed switch 14 is turned off. In other words, while operating the rotation angle detection sensor 10A, rotating the magnet 13A by 360 degrees around the central axis O, the reed switch 14 is turned on 4 times in the range of approximately 30 degrees, and it is turned off in other angle ranges.

Figure 9A:
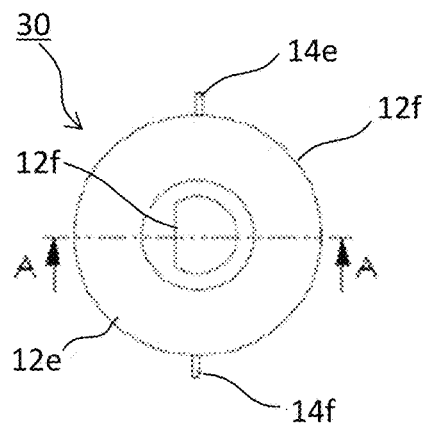
FIG. 9A is a plan view of a second embodiment of the rotation angle detection sensor.
Figure 9B:
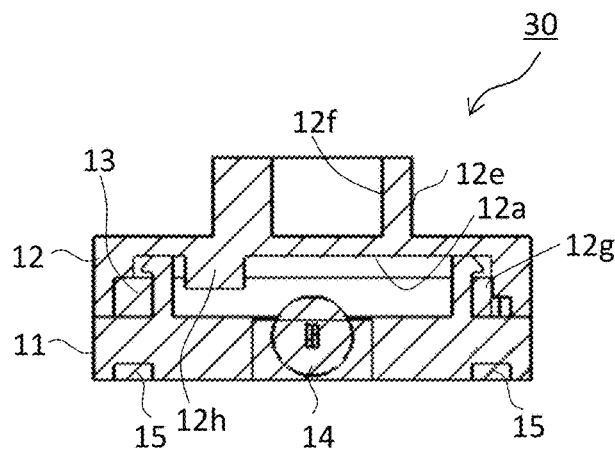
FIG. 9B is a cross-sectional view of FIG. 9A taken along line A-A.
Figure 9C:
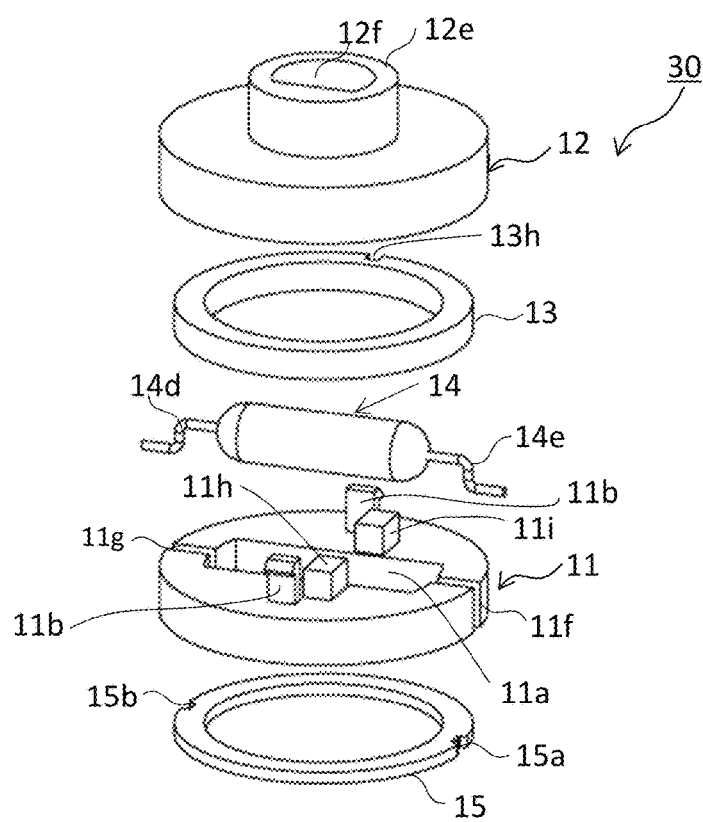
FIG. 9C is an exploded perspective view of FIG. 9A.

FIGS. 9A to 9C show the rotation angle detection sensor 30 in embodiment 2. Since the rotation angle detection sensor 3 has approximately the same structure as the rotation angle detection sensor 10 shown in FIG. 1, the same symbols are assigned to the same parts, and description will be omitted. The rotation angle detection sensor 30 includes a base 11, a cover 12, a magnet 13, a reed switch 14, and a back yoke 15.

As shown in FIG. 9C, the reed switch accepting part 11a of the base 11 penetrates down to the bottom face, and grooves 11f, 11g for accepting the reeds 14d, 14e of the reed switch 14 penetrate from the reed switch accepting part 11a in the longitudinal direction. Furthermore, the base 11 includes engagement parts 11h, 11i that extrude upward from the top face instead of the protrusions 11d, 11e (FIG. 1C) of the rotation angle detection sensor 10.

The cover 12 includes a rotary shaft mounting part 12e that extends from the top face concentrically with the central axis O, and this rotary shaft mounting part 12e has an engagement hole 12f that is open upwards. The engagement hole 12f is formed so that it can accept the rotary shaft 23, which is a part of the rotating part 22 of the structure 20. The engagement hole 12f is formed in a shape corresponding to the rotary shaft, a part of which is cut off.

The cover 12 has a protrusion 12g that protrudes inwards in the radial direction within the concave part 12a that is open downwards, and has a stopper 12h that protrudes from the top face inside the concave part 12a downwards instead of the engagement part 12c, 12d of the rotation angle detection sensor 10.

The magnet 13 has a cut portion 13h for positioning on its outer periphery. When the magnet 13 is housed in the concave part 12a of the cover 12, the cut portion 13h is engaged with the protrusion 12g to fix the rotational direction and rotation angle range of the magnet 13. When placed on the base 11, the engagement part 11b is engaged with the magnet 13 to the top edge from inside, and thus the magnet is prevented from coming off the base 11 and is support rotatably around the central axis O. The stopper 12h, which serves as the engagement part of the magnet 13, and the engagement parts 11h, 11i of the reed switch are thus respectively provided, and the engagement part of the magnet 13 is engaged with the engagement part of the reed switch 14, regulating the rotation detection angle of the magnet 13 with respect to the reed switch 14 to an arbitrary angle range.

The reed switch 14 is not mounted on a printed circuit board 14a but housed directly within the reed switch accepting part 11a, and its reeds 14d, 14e are drawn outside through the grooves 11f, 11g as lead wires. In this case, since the reed switch 14 is placed so that the glass pipe that covers the reeds enters the inner periphery of the magnet 13, the distance between the magnet 13 and the reeds 14b, 14c of the reed switch 14 is shortened, allowing downsizing of the entire device. The gap within the reed switch accepting part 11a of the base 11 is filled with a resin material, and when the material is hardened, the reed switch 14 is fastened.

The back yoke 15 has cut portions 15a, 15b respectively on both ends in the radial direction, and these cut portions 15a, 15b avoid contact with the reeds 14d, 14e drawn toward outside.

With the rotation angle detection sensor 30 in embodiment 2, when the area 13a of the magnet 13 is positioned perpendicular to the longitudinal direction of the reed switch 14 as shown in FIG. 3A, the same poles of the magnet 13 are lined up in the longitudinal direction of the reed switch 14, turning off the reed switch 14, which occurs twice during one turn. From this state, the rotating part 22 of the structure 20 rotates, allowing the cover 12 to be rotated around the rotary shaft 23 and the area 13a of the magnet 13 to be positioned in the longitudinal direction of the reed switch 14 as shown in FIG. 3B, and the opposite poles of the magnet 13 are line up in the longitudinal direction of the reed switch 14, turning on the reed switch 14. The rotation angle detection sensor 30 can thus detect that the rotation angle of the rotating part 22 is within a specified angle range with respect to the fixed part 21 of the structure 20.

The inventor et. al made a prototype of the rotation angle detection sensor 30 in embodiment 2, and performed magnetic simulation of the rotation angle detecting operation. As the magnet 13, a cylindrical isotropic ferrite magnet having outer diameter of 12 mm, inner diameter of 8 mm, and thickness of 1 mm was used, with double-sided 4-pole magnetization performed over the 30-degree angle range. As the reed switch 14, RD-18B by NIPPON ALEPH Co., Ltd. was used, and as the back yoke 15, a cold-rolled steel plate (SPCC) having outer diameter of 12 mm, inner diameter of 8 mm, and thickness of 0.5 mm was used. As shown in FIG. 5C, the magnet 13 was placed on the upper side 1 mm apart from the reed switch 14, and the back yoke 15 was place on the lower side 1 mm apart from the reed switch 14.

Figure 10:
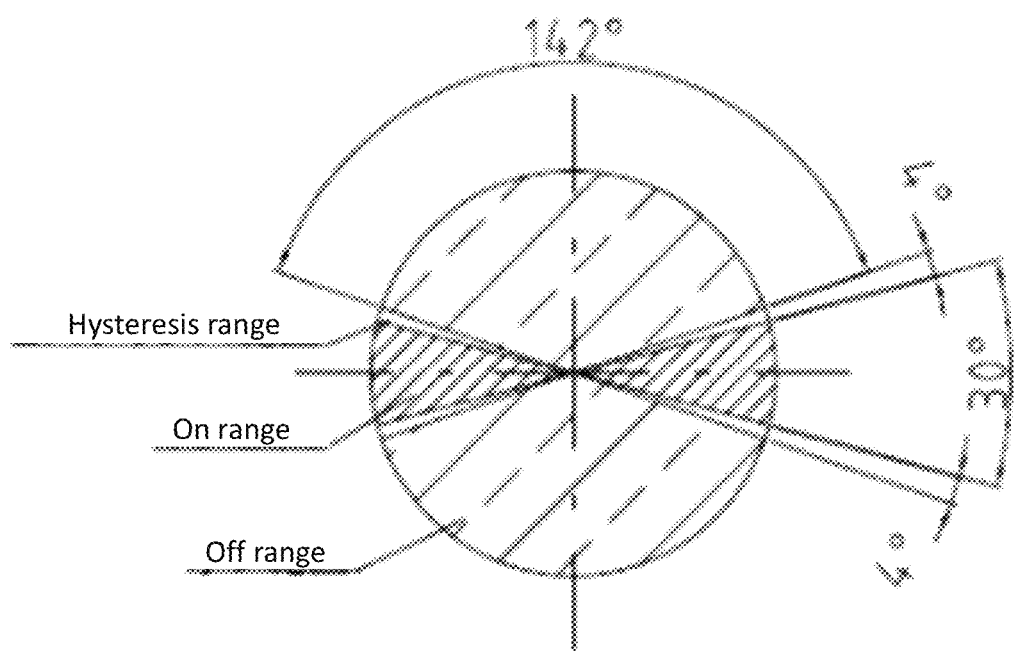
FIG. 10 is a graph showing the movement in the simulation of the embodiment of the rotation angle detection sensor in FIG. 9A.

The angle of on/off operation of the reed switch 14 was calculated based on magnetic simulation performed by operating the above-mentioned rotation angle detection sensor 30 with the magnet 13 rotated by 360 degrees around the central axis O. The result is shown in FIG. 10, the horizontal axis representing the longitudinal direction of the reed switch 14. The reed switch 14 operated bisymmetrically, was turned on respectively in the 30-degree angle range with respect to the longitudinal direction (horizontal axis) of the reed switch, and was turned off in the 142-degree angle range with four hysteresis ranges appearing in between. It was found that depending on the position of the back yoke 15, the hysteresis range becomes narrow, thus improving the accuracy of angle measurement. The actual operation of the prototype rotation angle detection sensor 30 also exhibited similar results.

The present invention can be executed in various embodiments without departing from the scope of the invention. As the magnet, 13, not only ferrite magnets but also magnets of other types, a neodymium magnet for example, can be used. In the embodiment shown, the back yoke 15 is placed so as to face the magnet 13, vertically sandwiching the reed switch 14. However, the back yoke 15 may be omitted. The area 13a of the magnet 13 is not limited to the range shown in the above embodiment, but the magnet may be reversely magnetized in an angle range larger than or smaller than 30 degrees. It is also apparent that the double-sided 8-pole-magnetized magnet 13A is applicable not only to the rotation angle detection sensor 10A in embodiment 1 but also to the rotation angle detection sensor 30 in embodiment 2. Rotation angle detection sensors 10, 10A, 30 may also be provided with a plurality of reversely magnetized areas 13a, in addition to the double-sided 8-pole magnetization, to detect angles at a plurality of positions, of the rotation angle range.

REFERENCE SIGN LIST 10, 10A, 30: Rotation angle detection sensor
11: Base
11a: Reed switch accepting part
11b: Engagement part
11c: Annular groove
11d, 11e: Protrusion
11f, 11g: Groove
11h, 11i: Engagement part
12: Cover
12a: Concave part
12b: Engagement part
12c, 12d: Protrusion
12e: Rotary shaft mounting part
12f: Engagement hole
12g: Protrusion
12h: Stopper
13, 13A: Magnet
13a, 13c: Reversely magnetized area
13b, 13d: Forwardly magnetized area
13af, 13bf: Magnetic flux
13h: Cut portion
14: Reed switch
14a: Printed circuit board
14b, 14c: Drawn lead wire
14d, 14e: Reed
15: Back yoke
15a, 15b: Cut portion
20: Structure
21: Fixed part
22: Rotating part
23: Rotary shaft

What is claimed is:

1. A rotation angle detection sensor mounted to a structure that includes a fixed part and a rotating part rotatably supported around a rotary shaft for detecting the rotation angle of the rotating part, comprising:
   a reed switch mounted to the fixed part or the rotating part of the structure perpendicular to the rotary shaft, with reeds arranged near the rotary shaft; and
   a flat annular magnet mounted to the rotating part or the fixed part of the structure at a specified position in the direction of the rotary shaft so that a magnetic circuit is formed with respect to the reed switch, central axis of the magnet being arranged concentrically with the rotary shaft,
   wherein the magnet is multi-pole magnetized in parallel to the central axis, and
   during the rotation of the magnet around the central axis with respect to the reed switch accompanying the rotation of the rotating part of the structure, when the same poles of the magnet are lined up in the longitudinal direction of the reed switch, both reeds of the reed switch are magnetized to the same pole, turning off the reed switch, and
   when opposite poles are lined up in the longitudinal direction of the reed switch, the both reeds of the reed switch are respectively magnetized to the opposite pole, turning on the reed switch.

2. The rotation angle detection sensor as set forth in claim 1, wherein a back yoke made of a magnetic material is arranged on the side of the reed switch, facing the circumference of the magnet.

3. The rotation angle detection sensor as set forth in claim 1, wherein the magnet and the reed switch are respectively provided with an engagement part, and as a result of engagement between the engagement part of the magnet and the engagement part of the reed switch, the rotation detection angle of the magnet with respect to the reed switch is regulated to an arbitrary angle.

4. The rotation angle detection sensor as set forth in claim 1, wherein only a specified angle range of the magnet with respect to the central axis is magnetized in a direction reverse to that of the remaining area.

5. The rotation angle detection sensor as set forth in claim 1, wherein the reed switch and the magnet are placed along the central axis of the rotation angle detection sensor.

* * * * *